US012576782B2

(12) United States Patent
Hashimoto et al.

(10) Patent No.: US 12,576,782 B2
(45) Date of Patent: Mar. 17, 2026

(54) VEHICLE OBJECT DETECTION SYSTEM AND METHOD FOR DETECTING A TARGET OBJECT IN A DETECTION AREA LOCATED BEHIND A SUBJECT VEHICLE

(71) Applicants:AUMOVIO Autonomous Mobility Germany GmbH, Ingolstadt (DE); TOYOTA JIDOSHA KABUSHIKI KAISHA, Toyota (JP)

(72) Inventors: Yuki Hashimoto, Singapore (SG); Takahiro Kohara, Toyota (JP); Tomohiko Mochizuki, Toyota (JP); Takayoshi Nohara, Toyota (JP); Masahiro Takahashi, Toyota (JP)

(73) Assignees: AUMOVIO Autonomous Mobility Germany GmbH, Ingolstadt (DE); TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

(21) Appl. No.: 18/483,593

(22) Filed: Oct. 10, 2023

(65) Prior Publication Data

US 2024/0131987 A1    Apr. 25, 2024
US 2024/0227670 A9    Jul. 11, 2024

(30) Foreign Application Priority Data

Oct. 19, 2022    (EP) ..................................... 22202564

(51) Int. Cl.
*B60Q 9/00* (2006.01)
*G01S 13/931* (2020.01)
*G08G 1/16* (2006.01)

(52) U.S. Cl.
CPC ............ *B60Q 9/008* (2013.01); *G01S 13/931* (2013.01); *G08G 1/16* (2013.01)

(58) Field of Classification Search
CPC ................... B60Q 9/008; G01S 13/931; G01S 2013/93272; G08G 1/16; G08G 1/167
See application file for complete search history.

(56) References Cited

U.S. PATENT DOCUMENTS

| | | | | |
|---|---|---|---|---|
| 5,631,639 | A | * | 5/1997 | Hibino ............ B60W 30/18145 340/435 |
| 2017/0305418 | A1 | | 10/2017 | Bae |

(Continued)

FOREIGN PATENT DOCUMENTS

| | | |
|---|---|---|
| JP | 2005-319827 A | 11/2005 |
| JP | 2007-91028 A | 4/2007 |

OTHER PUBLICATIONS

Office Action issued Mar. 11, 2025 in Japanese Application No. 2023-175342.

(Continued)

*Primary Examiner* — Daryl C Pope
(74) *Attorney, Agent, or Firm* — Sughrue Mion, PLLC

(57)    ABSTRACT

A vehicle object detection system configured to generate a judgement on whether a target object which has been detected to enter the detection area is an alert object, and to output the judgement to a warning which is configured to output a warning to a driver of the subject vehicle that a target object is present in the detection area behind the subject vehicle based on the judgement indicating that the target object is an alert object, wherein the system is configured to delay generating the judgment until a specified period of time has elapsed from a point in time when the target object is detected to enter a detectable area included in a field of view of a sensor, wherein the detectable area overlaps with only a part of the detection area.

12 Claims, 3 Drawing Sheets a)

b)

(56)                References Cited

U.S. PATENT DOCUMENTS

| 2019/0308617 | A1  | 10/2019 | Groult et al. |           |
|--------------|-----|---------|---------------|-----------|
| 2019/0389487 | A1  | 12/2019 | Gowda et al.  |           |
| 2020/0111369 | A1* | 4/2020  | Cho ................... | G01S 15/931 |
| 2022/0314940 | A1* | 10/2022 | Kim ................... | B60K 35/28 |

OTHER PUBLICATIONS

Japanese Office Action dated Nov. 19, 2024 in Application No. 2023-175342.

* cited by examiner b)

a)

VEHICLE OBJECT DETECTION SYSTEM AND METHOD FOR DETECTING A TARGET OBJECT IN A DETECTION AREA LOCATED BEHIND A SUBJECT VEHICLE

TECHNICAL FIELD

The invention relates to a vehicle object detection system for detecting a target object like a vehicle (also referred to as "target vehicle" below) in a detection area located behind a subject vehicle. Furthermore, the invention relates to a computer-implemented method for detecting a target object like a vehicle in a detection area located behind a subject vehicle, particularly for controlling a vehicle object detection system.

Moreover, the invention relates to a driver assistance system for a vehicle, comprising such a vehicle object detection system, a corresponding computer program for carrying out the computer-implemented method and a respective non-transitory computer-readable medium.

BACKGROUND

Conventional Driver Assistance Systems or Advanced Driver Assistance Systems (ADAS) for vehicles are widely used, for example, in connection with conventional vehicles as well as autonomous vehicles.

Many vehicle accidents are caused by human error, which might have been avoided by means of such Advanced Driver Assistance Systems. Commonly known safety-critical ADAS applications include pedestrian detection/avoidance, lane departure warning/correction, traffic sign recognition, automatic emergency braking, (rear-)-cross-traffic alert and blind spot detection (BSD), for example.

In connection with (rear-)-cross-traffic alert, the respective rear cross traffic alert (RCTA) system often uses the same detecting means like a radar infrastructure as the one used for detecting vehicles in the blind spot (BSD).

For example, long range radars (long range radar sensors) are usually used for applications like emergency brake assist and adaptive cruise control, while short-range-radars are often employed in connection with applications like blind spot detection (BSD), rear-cross-traffic-alert, lane-change-assist and rear pre-crash systems, for example.

Such rear pre-crash systems track vehicles approaching from behind of a subject vehicle, for example, from an adjacent lane being adjacent to the lane of the subject vehicle (referred to as own lane or ego lane) and, in the event of an imminent collision, pre-activate safety devices such as indicators (optical or acoustic indicators), airbags, seat belts etc.

In case of a dangerous situation like a road rage or tailgating situation (target vehicle behind subject vehicle comes dangerously close to the subject vehicle), a rear traffic approaching notification (RTAN) may be output to a driver of the subject vehicle by means of such an indicator, which notification is usually output by a Rear Approaching Target Notification System (RTAN system) and Long-range Rear Approaching Target Notification System (L-RTAN system) implemented by the vehicle object detection system.

However, even if a target vehicle enters the (own/ego) lane of the subject vehicle, it is not always necessary to output or activate an alarm warning for the attention of the driver of the subject vehicle that a vehicle is approaching from behind of the subject vehicle.

In other words, in some cases, judging means of a conventional target object detection systems used for rear traffic approaching notifications judge a target object like another vehicle which has been detected to enter the detection area behind the subject/ego vehicle, i.e. the rear traffic zone behind the ego/subject vehicle, to be an alert object and output a result of this judgement to warning means which immediately outputs a warning to a driver of the subject vehicle that a target vehicle is present in the detection area behind the subject vehicle, even if no notification would be necessary as there is actually no dangerous situation like an alarm/alert situation.

This is because, in some cases, it is difficult for detecting and judging means of RTAN systems to detect a target vehicle behind the subject vehicle and to differentiate between an alert relevant target vehicle on the own lane or adjacent lane, and a target vehicle on the adjacent lane which would be no alert object.

For example, in some cases, the target vehicle is driving straight, i.e. in parallel, on the adjacent lane with respect to the subject vehicle, and momentarily touches/enters the detection area constituting an RTAN zone from one side, which is detected by the RTAN system of the subject vehicle. Object tracking by radar detection of the radar sensors as used in RTAN systems is often associated with position errors. In particular, target vehicles entering the detection area/RTAN zone on one side opposite to a side where a respective radar sensor is located, i.e. located on the other side at a rear edge of the subject vehicle, are therefore detected at an edge of a field of view (FoV) of the respective radar sensor. Thus, such a target vehicle is detected, by this radar sensor, even less accurately in terms of its position.

In such cases, even though the target vehicle may not collide with the subject vehicle or not be any danger for the subject vehicle, by virtue of being partially in the RTAN zone for a short period of time, i.e. the zone detectable by the respective short range sensor, it may trigger a warning by the respective sensor detecting the target vehicle with less accuracy. That is, in such situations, it is difficult to distinguish between a non-dangerous situation and a dangerous situation by using only short range sensors, especially if the target object is at a far range and therefore inaccurately detected by the sensors.

This difficulty may be caused by constructional aspects of the left and right rear-corner short range radar sensors of the radar infrastructure of the subject vehicle, like a limited field of view (FoV) of these radar sensors, for example. This degrades the accuracy of nearby object position detection and object tracking.

SUMMARY OF THE INVENTION

A vehicle object detection system according to the invention is for detecting a target object like a vehicle in a detection area located behind a subject vehicle, the vehicle object detection system comprising judging means configured to generate a judgement on whether a target object like a target vehicle which has been detected to enter the detection area is an alert object, and to output the judgement to warning means which is configured to output a warning to a driver of the subject vehicle that a target object is present in the detection area behind the subject vehicle based on the judgement indicating that the target object is an alert object, wherein the judging means is configured to delay generating the judgment until a specified period of time has elapsed from a point in time when the target object is detected to enter a detectable area included in a field of view of a sensor, wherein the detectable area overlaps with only a part of the detection area.

By means of the invention, a warning decision/judging algorithm for the Rear Approaching Target Notification (RTAN) system which comprises the vehicle object detection system according to the invention can be improved by employing a warning delay time (specified period of time) for suppressing a warning due to a detected target object like another target vehicle coming from a side of the detectable area, which is opposite to the side where the sensor, like a rear corner (radar) sensor of the subject vehicle, is located/arranged.

By means of applying such a delay time (specified period of time) for suppressing a warning due to a target object like another vehicle (also referred to as target vehicle) which enters the detectable area of the sensor (left or right corner/rear edge radar sensor) from the side of the detectable area, which is opposite the side where the sensor is located/arranged, the function of distinguishing the target object to be a relevant alert object and non-relevant/no alert object can be improved as a output of a potential false warning is suppressed for the duration of the specified period of time. An example of such a non-relevant/no alert object may be a target object/vehicle on the adjacent lane being adjacent of the own lane of the subject vehicle which temporarily, i.e. for a short period of time, touches/enters the detectable area of the sensor, a ghost object, and so on.

In comparison, with a conventional vehicle object detection system, Rear Approaching Target Notification is falsely activated when a target object like another vehicle on an adjacent area being located lateral to the detection area and corresponding to an adjacent lane passes by the subject vehicle. This is because accuracy of object tracking for near range sensor on the other side of the vehicle where the target object entered the detection area is error-prone. For this reason, the invention provides the delay time (set by a delay timer/counter) which shall be calculated for the target object which entered the detection area, when the following conditions are fulfilled:

the target object is partially overlapping with the detectable area of the respective sensor which is located on a side opposite to the side of the detection area where the target object entered the detection area (RTAN zone);

the rear edge/end of target object is closer to the respective sensor than the rear edge/end of respective detectable area of the respective sensor, i.e. the rear edge/end of target object is inside the detectable area.

If these conditions are fulfilled, the delay time will be started and suppresses the output of a warning (RTAN warning), for example, for a period of time between 1000 ms to 1300 ms, preferably approx. 1250 ms, in respect of the sensor which detected the target object.

However, the delay time may vary dependent on the type of sensors and systems used in the respective vehicle.

Accordingly, the delay time, i.e. the specified period of time, is set if the conditions listed above are met in the cycle when the target object first enters the RTAN zone and the detectable area of the respective sensor which is located on the side opposite to the side of the RTAN zone (detection area) where the target object entered the RTAN zone. In the other case, the delay time not set.

As a premise, the RTAN system notifies to the driver of a warning if a target object is detected by either left or right sensor. A possible side-effect of the delay-time is late warning when the target actually entered RTAN zone. However, since the delay-time is not applied to target objects detected by the sensor which is located on the same side of the detection area where the target object entered the detection area, the RTAN system can activate a warning without delay in such a case as a warning will still be output due to a detection of a target object of the sensor located on the same side. In other words, the outputs of the respective sensors are managed independently of each other.

One of the advantageous effects achieved by the invention is thus to avoid unnecessary alarm warnings/activations.

In particular, the vehicle object detection system can be further modified in such a manner that the judging means is configured to delay generating the judgment until said specified period of time has elapsed from the point in time when the target object entered the detectable area from a lateral side of the detectable area or from an edge of the field of view of the sensor.

The vehicle object detection system according to the invention can be further configured in such a way that the judging means is configured to delay generating the judgement, in response to the target object being detected to enter the detectable area and being detected to enter the detection area from a first side of the detection area, wherein the first side is opposite to a second side of the detection area where the sensor is located.

Moreover, the vehicle object detection system according to the invention can be further formed in such a way that the judging means is configured to delay generating the judgement in response to a rear edge or end of the target object being detected to be closer to the sensor, which detected the target object to enter the detectable area, than a distal end of the detectable area to the sensor.

In this connection, the rear edge or end of the target object corresponds to a distal edge or end of the target object with respect to the sensor and a front edge or end of the target object corresponds to a proximal edge or end of the target object with respect to the sensor and is closer to the sensor than the rear edge or end.

In essence, the detectable area of each sensor, where target objects can be detected with high accuracy, does not cover the whole detection area but each corner sensor can merely monitor a part of the detection area with high accuracy, while the remaining part of the detection area is either not at all monitored or merely with low accuracy.

Furthermore, the vehicle object detection system according to the invention can be further realized in such a way that the target object, seen from a normal direction of the detection area, is detected to at least partially overlap with the detectable area of the sensor.

In other words, the target object like the other target vehicle has a lateral overlap with the detectable area, which is in a lateral direction corresponding to a direction perpendicular to the longitudinal direction of the lane or vehicle.

Furthermore, the vehicle object detection system according to the invention can be modified in such a way that the judging means is configured to generate the delayed judgement indicating that the target object is an alert object or not an alert object after elapse of the specified period of time. In other words, warning suppression is cancelled after the specified period of time has elapsed.

A driver assistance system according to the invention is for a subject vehicle and comprises detecting means configured to detect a target object in a detection area located behind the subject vehicle, the detecting means comprising a sensor configured to detect a target object in a detectable area included in a field of view of the sensor, overlapping only with a part of the detection area, a vehicle object detection system according to the invention as outlined above, and warning means configured to warning a driver of the subject vehicle that a target object is present in the detection area only based on the judgement of judging means of the vehicle object detection system, indicating that the target object is an alert object.

The driver assistance system according to the invention can be further realized in such a way that the detecting means comprises at least two sensors, preferably at least two radar sensors, like two short-range radar sensors, configured to detect a target object in the detection area, each sensor monitoring a different detectable area included in a respective field of view of the respective sensor, each of the different detectable areas overlapping only with a part of the detection area. Accordingly, each sensor may trigger the output of a warning independently of each other, unless a delay time, i.e. said specified period of time, is set for a respective sensor.

Moreover, the driver assistance system according to the invention can be further configured in such a way that the warning means is configured to output a warning to a driver of the subject vehicle that a target object is present in the detection area based on the judgement of the judging means, indicating that the target object detected by one of the sensors is an alert object, and to not output of a warning even if the target object is detected in the detection area by the other of the sensors based on the judging means delaying generating the judgement for the other sensor.

Accordingly, as mentioned above, the outputs of the different sensors are judged independently of each other. That is, while the judgement of the output of one sensor is delayed until elapse of the specified period of time, the judgment of the output of the other sensor may nevertheless result in output of warning to the driver.

A vehicle according to the invention comprises the above-mentioned driver assistance system according to the invention, wherein the one sensor is located at a left rear edge/region or end region of the vehicle and the other sensor is located at a right rear edge/region or end region of the vehicle.

A method according to the invention is for detecting a target object in a detection area located behind a subject vehicle, particularly for controlling the above-mentioned vehicle object detection system according to the invention, wherein the method comprises the steps of generating a judgement on whether a target object which has been detected to enter the detection area is an alert object, and outputting the judgement to warning means which is configured to output a warning to a driver of the subject vehicle that a target object is present in the detection area behind the subject vehicle based on the judgement indicating the target object is an alert object, wherein generating the judgment is delayed until a specified period of time has elapsed from a point in time when the target object is detected to enter a detectable area included in a field of view of a sensor, wherein the detectable area overlaps with only a part of the detection area.

Accordingly, the properties and advantages explained in connection with the vehicle object detection system according to the invention arise in the same or similar manner in respect of the method for detecting a target object in a detection area located behind a subject vehicle according to the present invention, which is why, in order to avoid repetitions, reference is made to the respective explanations with respect to the vehicle object detection system according to the invention.

A computer program according to the invention comprises instructions which, when the program is executed by a computer or a processor, cause the computer or processor to carry out the above-mentioned computer-implemented method according to the invention.

A non-transitory computer-readable medium according to the invention has stored thereon the above-mentioned computer program according to the invention.

BRIEF DESCRIPTION OF THE DRAWINGS

Preferred embodiments and advantages of the invention will become more apparent upon reading the following detailed description along with the accompanying drawings in which.

DETAILED DESCRIPTION

In this context, the vehicle object detection system as described in this description may include a memory which is for example used in the processing carried out in the vehicle object detection system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In this context, the vehicle object detection system as described in this description may include a processor or a "circuit". A "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

With reference to the drawings, one preferred embodiment of the present invention will now be specifically described for illustrative purposes. It is to be understood that components or elements in this embodiment will be shown and described by way of examples only, but are not intended to limit this invention to them.

Figure 1:
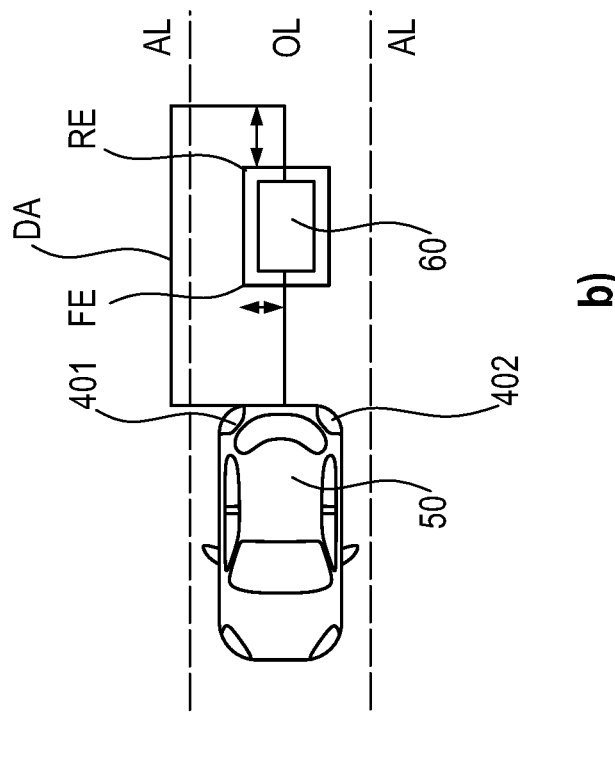
FIG. 1 at a) and b) shows one embodiment of a vehicle according to the invention provided with a driver assistance system according to the invention in two different respective situations.
Figure 1:
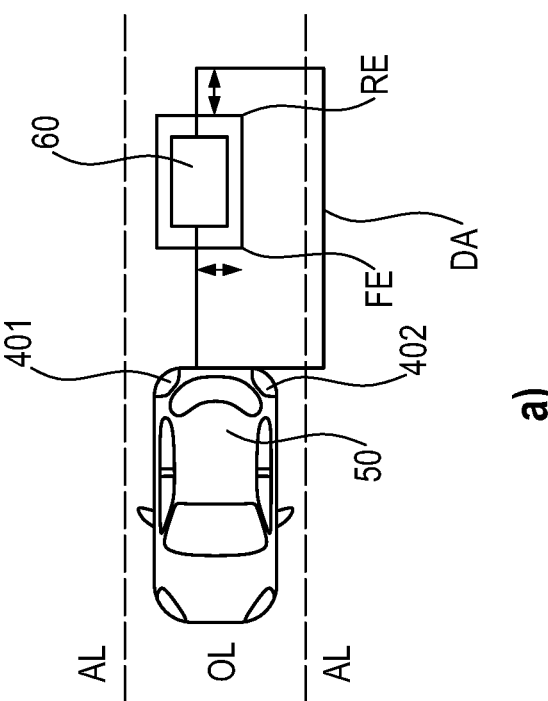

FIG. 1 at a) and b) shows one embodiment of a vehicle 50 (referred to as "subject vehicle" below) according to the invention, which is provided with a driver assistance system 1 according to the invention in two different respective situations, which driver assistance system 1 will be described in more concrete terms in connection with FIG. 3.

Figure 3:
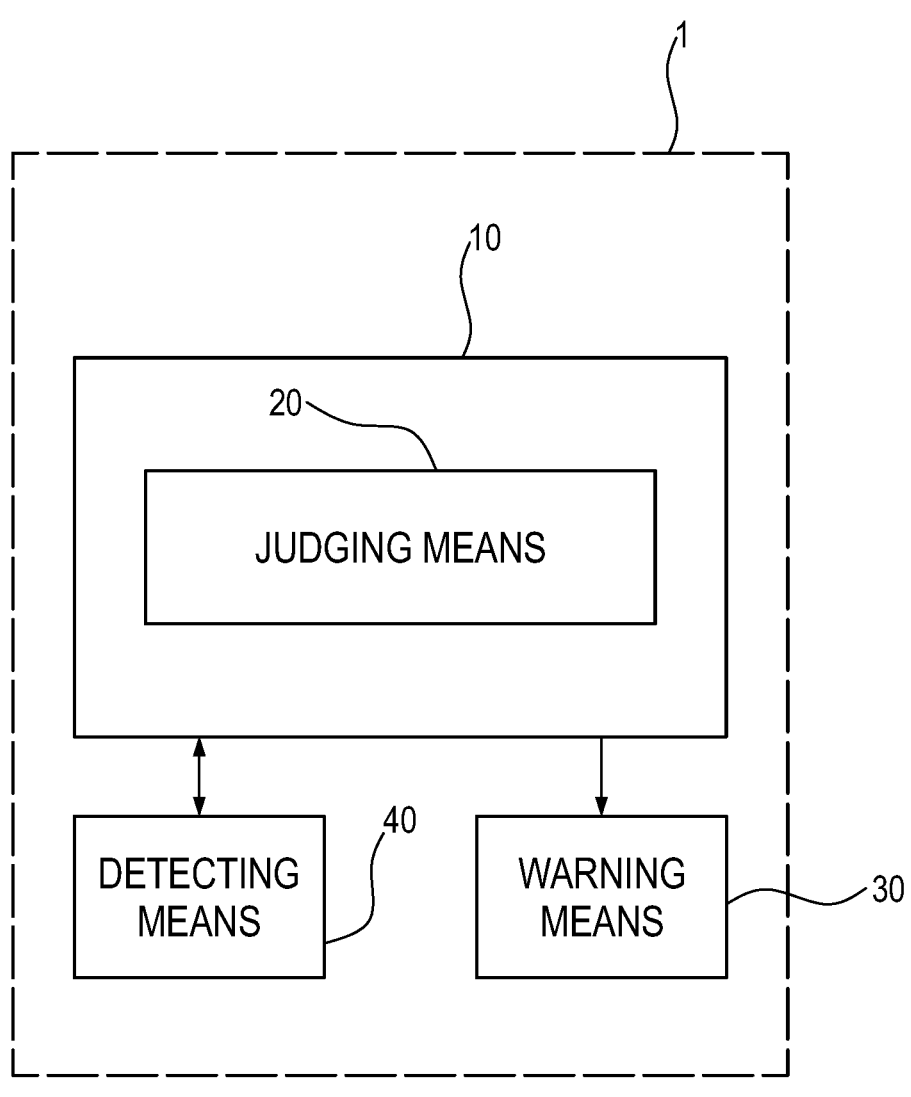
FIG. 3 shows a schematic configuration of the driver assistance system according to the invention of FIG. 1.

FIG. 3 shows, in more detail, a schematic configuration of the driver assistance system 1 according to the invention of FIG. 1.

As can be gathered from FIG. 3, the driver assistance system 1 provided in the subject vehicle 50 comprises a vehicle object detection system 10 according to the invention, detecting means 40 and warning means 30.

The detecting means 40 is configured to detect a target object 60 like another vehicle (also referred to as "target vehicle") in a detection area OL located behind the subject vehicle 50, which will be described below.

In this embodiment, the detecting means 40 comprises radar sensors 401, 402 for detecting a target object 60 in the detection area OL. These sensors 401, 402 may be part of a conventional (rear-)cross-traffic alert system, for example, and are—in this specific embodiment—short range radar sensors 401, 402 which are capable of independently detecting at least a relative position of the target object 60 with respect to the subject vehicle 50, a relative velocity of the target object 60 with respect to the subject vehicle 50, respectively, in the longitudinal direction of the subject vehicle 50 (x-direction of the vehicle according to the conventional vehicle coordinate system) and the transverse direction of the vehicle (x-direction of the vehicle according to the conventional vehicle coordinate system).

In more concrete terms, as can be gathered from FIG. 1, the two short range radar sensors 401, 402 are each configured to detect the target object 60 in the detection area OL, wherein the one sensor 402 is located at a left rear edge/region of the vehicle 50 and the other sensor 401 is located at a right rear edge/region of the vehicle 50.

Thus, each sensor 401, 402 monitors/detects, due to their restricted field of views (FoVs), a different detectable area DA included in a respective field of view of the respective sensor 401, 402, wherein each of the different detectable areas DA overlap only with a part of the detection area OL. The respective sensors 401, 402 are capable of detecting target objects 60 in their detectable areas DA with high accuracy, for example, high position accuracy, velocity accuracy and so on, while the respective sensors 401, 402 may detect target objects 60 outside of their detectable areas DA with low accuracy or may not at all detect target objects 60 outside of their detectable areas DA.

In more detail, in this embodiment, as can be also gathered from FIG. 1, the detection area OL of the subject vehicle 50, which is monitored by the detecting means 40 which, for example, uses the radar infrastructure comprising the radar sensors 401, 402 for detecting target objects 60 like vehicles behind the subject vehicle 50, at least corresponds to a region of the own lane of and behind the subject vehicle 50. In addition, the detecting means 40 is preferably also capable of detecting/monitoring target objects 60 in an adjacent area AL being located lateral to the detection area OL (own lane of subject vehicle) and at least corresponds to an adjacent lane being adjacent to the own lane of the subject vehicle 50. In turn, the two sensors 401, 402, independently of each other, monitor different detectable areas DA included in the field of view of the respective sensors 401, 402, which only corresponds to a part of the region of the own lane of and behind the subject vehicle 50.

In essence, the one sensor 402 located at the left rear edge/region of the vehicle 50 monitors the detectable area DA which is predominantly located on the left side of the detection area OL with respect to the subject vehicle 50 (see FIG. 1 at a)), while the other sensor 401 located at the right rear edge/region of the subject vehicle 50 monitors the detectable area DA which is predominantly located on the right side of the detection area OL with respect to the subject vehicle (see FIG. 1 at b)). Both detectable areas DA of both sensors 401, 402 may overlap in a mid-region of the detection area OL.

The warning means 30 is configured to warn a driver of the subject vehicle 50 that a target object 60 is present in the detection area OL. For example, the warning means may be a conventional visual or acoustic indicator (display or speaker) capable of notifying the driver of the subject vehicle 50 that the target object 60 is present in the detection area OL.

The vehicle object detection system 10 is for detecting or processing of detection of the target object 60 in the detection area OL (own lane of the subject vehicle) located behind the subject vehicle 50 and comprises judging means 20. The vehicle object detection system 10 may, for example, be implemented by a processor or computer, which has stored several programs for carrying out the function(s) of judging means 20 and also conventional functions.

The judging means 20, which may be formed by a processor, i.e. in this embodiment by a judging processor, is configured to judge or generate a judgement on whether a target object 60 which has been detected to enter the detection area OL is an alert object or not an alert object, i.e. no alert object, and is further configured to output the judgement to the warning means 30 which, in turn, is configured to output a warning to a driver of the subject vehicle 50 that a target object 60 is present in the detection area OL behind the subject vehicle 50 only if the judgement of the judging means 20 indicated that the target object 60 is an alert object. In the other case, i.e. when the judging means 20 outputs a judgement to the warning means 30, indicating to the warning means 30 not to output a warning even if a target object 60 has been detected, i.e. the judging means 20 judged the target object 60 to be not an alert object, the warning means 30 will not output any warning to the driver of the subject vehicle 50.

Moreover, the judging means 20 is configured to delay generating the judgment on whether the target object 60 is an alert object, even if the target object 60 is present in the detection area OL, until a specified period of time has elapsed from a point in time when the target object 60 entered a respective detectable area DA included in the field of view of one of the sensors 401, 402, overlapping only with a part of the detection area OL, from a lateral side of the detectable area DA.

In more concrete terms, the judging means 20 delays generating the judgement for the specified period of time if the target object 60 is detected to enter the detectable area DA from the lateral side of the detectable area DA, coming from one side of the detection area OL, which is opposite to the other side of the detection area OL where the respective sensor 401, 402 is located and if a rear edge or end RE of the target object 60, on the side of the respective sensor 401, 402 which detected the target object 60 to enter the detectable area DA, is detected to be closer to the respective sensor 401, 402 than a distal end of the detectable area DA to the respective sensor 401, 402. That is, in other words, the rear edge or end RE of the target object 60 is a distal edge or end of the target object 60 with respect to the respective sensor 401, 402 and a front edge or end FE of the target object 60 being a proximal edge or end of the target object 60 with respect to the respective sensor 401, 402 and being closer to the sensor 401, 402 than the rear edge or end RE.

In this respect, the judging means 20 delays generating the judgement for the specified period of time if the target object is detected to enter the detectable area DA from the lateral side of the detectable area DA, coming from the side of the detection area OL which is opposite to the other side of the detection area OL where the respective sensor 401, 402 is located, which means that the target object 60, seen from a normal direction of the detection area OL, at least partially overlaps with the detectable area DA of the respective sensor. Based on the extent of overlap, which is basically a lateral overlap with respect to the detectable area DA of the respective sensor and on the rear edge/end of the target object 60 being inside the detectable area DA, it is judged whether to delay generating the judgment or not.

If the specified period of time has elapsed, the judging means 20 makes the judgement, which has been delayed, on whether the target object is an alert object or not an alert object.

In any case, the warning means 30 outputs a warning to a driver of the subject vehicle 50 that a target object 60 is present in the detection area OL if the judging means 20 generates the judgement indicating that the target object 60 is an alert object, and does not output of a warning even if a target object 60 is detected in the detection area OL by the detecting means 40, as long as the specified period of time has not elapsed or if the judging means 20 generated the judgment indicating that the target object 60 is not an alert object.

In this embodiment, the output of a warning by the warning means 30 is triggered independently of each sensor 401, 402. That is, if one of the sensors 401, 402 detects a target object 60, the judgment on whether the detected target object 60 is an alert object or not an alert object, can be either delayed or not for the respective sensor 401, 402. As a consequence of this, while the output of a warning of one sensor 401, 402 to be judged to be an alert object nor not an alert object can be delayed, the other sensor 401, 402 may trigger an output for a warning, i.e. the judgement on whether the target object 60 is an alert object or not an alert object can nevertheless be made.

Figure 2:
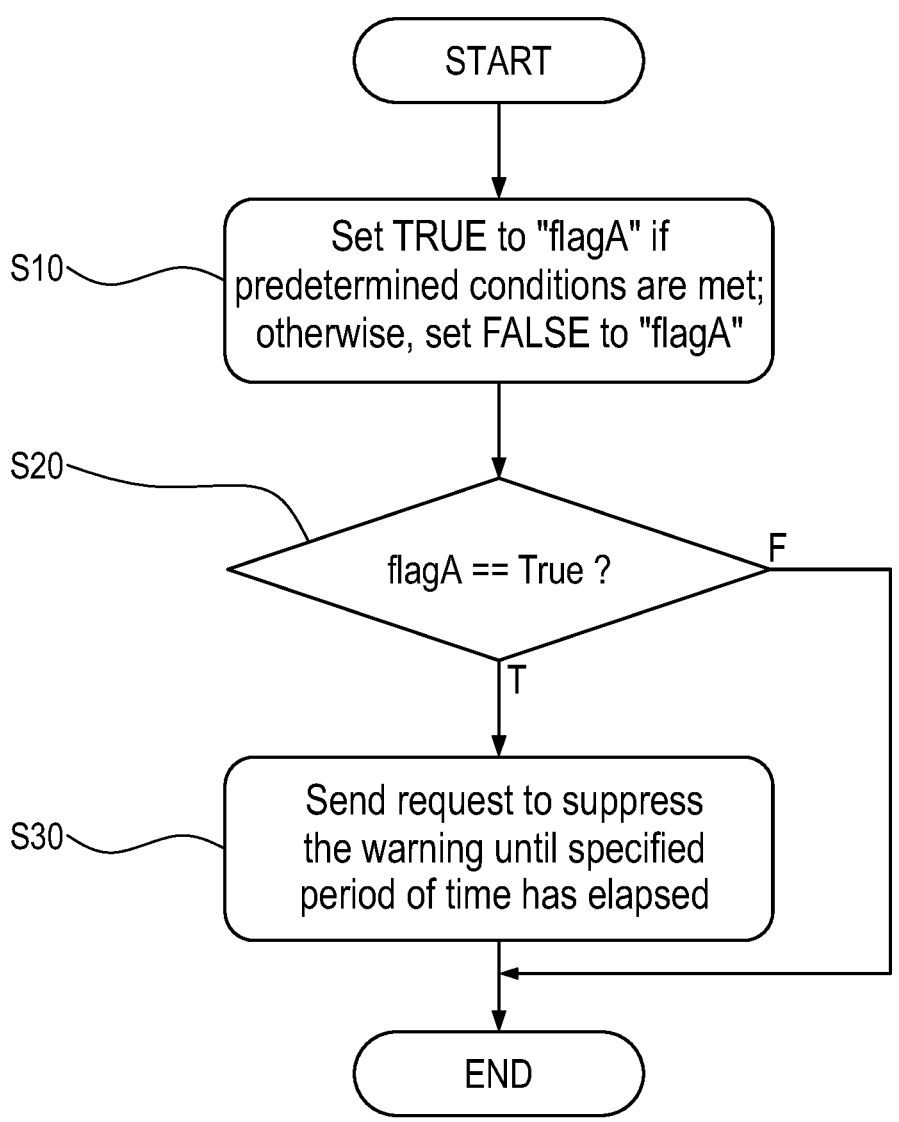
FIG. 2 shows a flowchart of a judging process carried out by the driver assistance system according to the invention of FIG. 1.

FIG. 2 shows a flowchart of a judging process carried out by the driver assistance system 1 according to the invention of FIG. 1. In more detail, the judging process as shown in FIG. 2 is carried out by the judging means 20.

As can be seen in FIG. 2, in step 10, a data structure in the form of a flag "flagA" (alarm flag for triggering an alarm/or warning process of the warning means 30) is either set to "True" or "False" dependent on the judgement of the judgement means 20. In more detail, the "flagA" is set to TRUE if the judging means 20 generated the judgement indicating that the target object 60 detected by one of the sensors 401, 402 is not an alert object for the time being if the above mentioned conditions are fulfilled. In the other case, i.e. the judging means 20 generated the judgement indicating that the target object 60 detected by the one of the sensors 401, 402 is an alert object, the "flagA" is set to FALSE. Next, the procedure moves to step S20 in which it is checked whether the "flagA" is set to TRUE. If it is set to TRUE, the procedure moves to step S30, otherwise step S30 is skipped and the procedure is ended.

In step S30, a request to suppress a warning/alarm is sent to the warning means 30, according to which it is indicated in respect of the one sensor 401, 402 which detected the target object 60, that the target object 60 is not an alert object for the time being so that no warning/alarm is output by the warning means 30 at least until the generation of the next judgement, i.e. until the next judgement which will be generated after the specified period of time has elapsed.

In other words, the judging means 20 outputs to the warning means 30 in respect of the one sensor 401, 402 which detected the target object 60, to suppress a warning even if a target object 60 has been detected, as the judging means 20 considers the target object 60 to be not an alert object for the time being. Accordingly, detection of a target object 60 detected by the other sensor 401, 402 is still possible and may still trigger a warning output by the warning means 30.

Next, one example of operation of the driver assistance system 1 provided with the vehicle object detection system 10 is described on the basis of FIG. 1 at a) and b).

As can be seen in FIG. 1 at a), the subject vehicle 50 is driving forward and a target object 60, i.e. another target vehicle, enters the detection area OL. In particular, the target object 60 enters the right side of the detectable are DA of the left rear edge/region sensor 402 located at a left rear edge/region of the subject vehicle 50.

In turn, as can be seen in the other example of FIG. 1b), the subject vehicle 50 is driving forward and a target object 60, i.e. another target vehicle, enters the left side of the detectable area DA of the right rear edge/region sensor 402 located at a right rear edge/region of the subject vehicle 50.

In both cases, the judgement is generated by the judging means 20 on whether the target object 60 which has been detected to enter the detection area OL is an alert object, and a result of judgement is output to warning means 30 which outputs a warning to a driver of the subject vehicle 50 that a target object 60 is present in the detection area OL behind the subject vehicle 50 if the judging means generated the judgement indicating that the target object 60 is an alert object.

In the case of FIG. 1 at a) and b), the generation of the judgment is, however, delayed, even if the target object 60 is present in the detection area OL, until a specified period of time has elapsed from the point in time when the target object 60 entered the respective detectable area DA of the respective sensor 601, 602 as the target object 60 has a lateral overlap in the respective detectable area DA and the rear edge/end RE of the target object 60 is closer to the sensor 601, 602 than the rear edge/end of the detectable area DA, i.e. is inside the detectable area DA. Thus, the output of the warning for the left rear edge/region sensor 402 in FIG. 1 at a) or for the right rear edge/region sensor 401 in FIG. 1b) is delayed for, for example, 25 cycles by the delay counter (specified period of time), and then it is a judgment is possibly generated by the judgment means 20 whether the target object 60 is an alert object or not an alert object. The output of the respective other sensor, i.e. the right rear edge/region sensor 401 in FIG. 1 at a) or the left rear edge/region sensor 402 in FIG. 1b) is not affected by the delay time.

The features of the invention disclosed in the foregoing description, in the drawings as well as in the claims may be essential for the realization of the invention both individually and in any combination.

The invention claimed is:

1. A vehicle object detection system (10) for detecting a target object (60) in a detection area (OL) located behind a subject vehicle (50), the vehicle object detection system (10) comprising:

judging means (20) configured to generate a judgement on whether a target object (60) which has been detected to enter the detection area (OL) is an alert object, and to output the judgement to warning means (30) which is configured to output a warning to a driver of the subject vehicle (50) that a target object (60) is present in the detection area (OL) behind the subject vehicle (50) based on the judgement indicating that the target object (60) is an alert object, wherein the judging means (20) is configured to delay generating the judgment until a specified period of time has elapsed from a point in time when the target object (60) is detected to enter a detectable area (DA) included in a field of view of a sensor (401, 402), wherein the detectable area overlaps with only a part of the detection area (OL).

2. The vehicle object detection system (10) according to claim 1, wherein the judging means (20) is configured to delay generating the judgment until said specified period of time has elapsed from the point in time when the target object (60) entered the detectable area (DA) from a lateral side of the detectable area (DA) or from an edge of the field of view of the sensor (401, 402).

3. The vehicle object detection system (10) according to claim 1, wherein the judging means (20) is configured to delay generating the judgement, in response to the target object being detected to enter the detectable area (DA) and being detected to enter the detection area (OL) from a first side of the detection area (OL), wherein the first side is opposite to a second side of the detection area (OL) where the sensor (401, 402) is located.

4. The vehicle object detection system (10) according to claim 1, wherein the judging means (20) is configured to delay generating the judgement in response to a rear edge or end of the target object (60) being detected to be closer to the sensor (401, 402), which detected the target object to enter the detectable area (DA), than a distal end of the detectable area (DA) to the sensor (401, 402).

5. The vehicle object detection system (10) according to claim 1, wherein the target object (60) is detected to have a lateral overlap with the detectable area (DA), which is in a lateral direction corresponding to a direction perpendicular to a longitudinal direction of the subject vehicle (50).

6. The vehicle object detection system (10) according to claim 1, wherein the judging means (20) is configured to generate the delayed judgement indicating that the target object (60) is an alert object or not an alert object after elapse of the specified period of time.

7. A driver assistance system (1) for a subject vehicle (50), comprising:
    detecting means (40) configured to detect a target object (60) in a detection area (OL) located behind the subject vehicle (50), the detecting means (40) comprising a sensor (401, 402) configured to detect a target object (60) in a detectable area (DA) included in a field of view of the sensor (401, 402), overlapping only with a part of the detection area (OL),
    a vehicle object detection system (10) according to claim 1, and
    warning means (30) configured to warning a driver of the subject vehicle that a target object is present in the detection area (OL) only based on the judgement of judging means (20) of the vehicle object detection system (10), indicating that the target object (60) is an alert object.

8. The driver assistance system (1) according to claim 7, wherein the detecting means (40) comprises at least two configured to detect a target object (60) in the detection area (OL), each sensor (401, 402) monitoring a different detectable area (DA) included in a respective field of view of the respective sensor, each of the different detectable areas (DA) overlapping only with a part of the detection area (OL).

9. The driver assistance system (1) according to claim 7, wherein the warning means (30) is configured to output a warning to a driver of the subject vehicle (50) that a target object (60) is present in the detection area (OL) based on the judgement of the judging means (20), indicating that the target object (60) detected by one of the sensors (401, 402) is an alert object, and to not output of a warning even if the target object (60) is detected in the detection area (OL) by the other of the sensors (401, 402) based on the judging means (20) delaying generating the judgement for the other sensor.

10. A vehicle, comprising
    a driver assistance system (1) according to claim 7, wherein the one sensor (401, 402) is located at a left rear edge/region of the vehicle and the other sensor (401, 402) is located at a right rear edge/region of the vehicle.

11. A computer-implemented method for detecting a target object (60) in a detection area (OL) located behind a subject vehicle (50), particularly for controlling a vehicle object detection system (10) according to claim 1, wherein the method comprises the following steps:
    generating a judgement on whether a target object (60) which has been detected to enter the detection area (OL) is an alert object, and outputting the judgement to warning means (30) which is configured to output a warning to a driver of the subject vehicle (50) that a target object (60) is present in the detection area (OL) behind the subject vehicle (50) based on the judgement indicating the target object (60) is an alert object,
    wherein generating the judgment is delayed until a specified period of time has elapsed from a point in time when the target object (60) is detected to enter a detectable area (DA) included in a field of view of a sensor (401, 402), wherein the detectable area overlaps with only a part of the detection area (OL).

12. A non-transitory computer-readable medium having stored thereon a computer program comprising instructions which, when the program is executed by a computer, cause the computer to carry out the computer-implemented method of claim 11.

* * * * *